Oct. 21, 1958  E. BURKE ET AL  2,857,133
TURBINE APPARATUS
Filed May 13, 1953
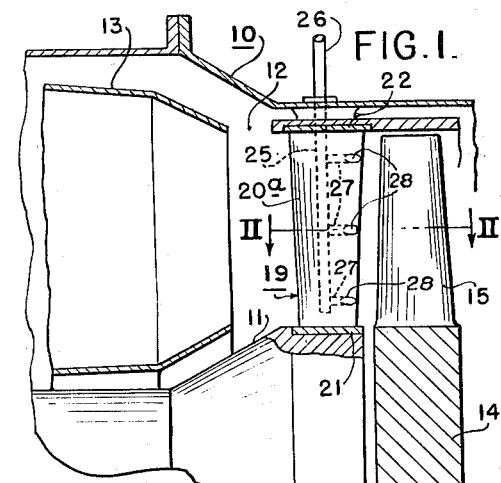
FIG. 1.
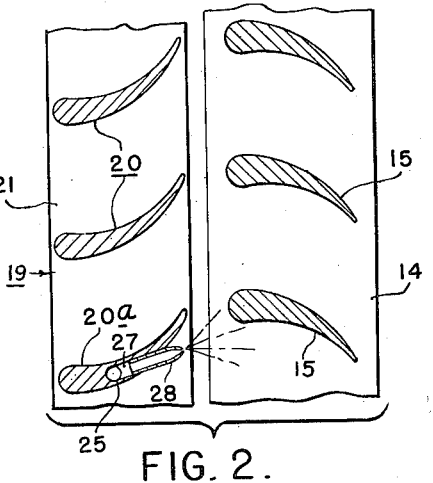
FIG. 2.
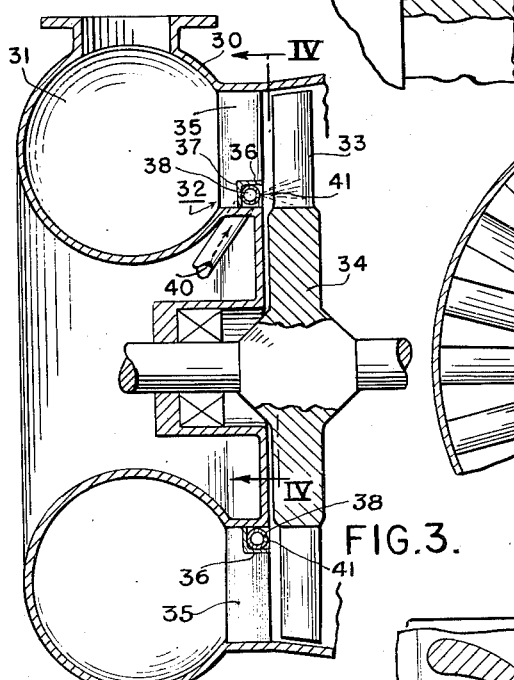
FIG. 3.
FIG. 4.
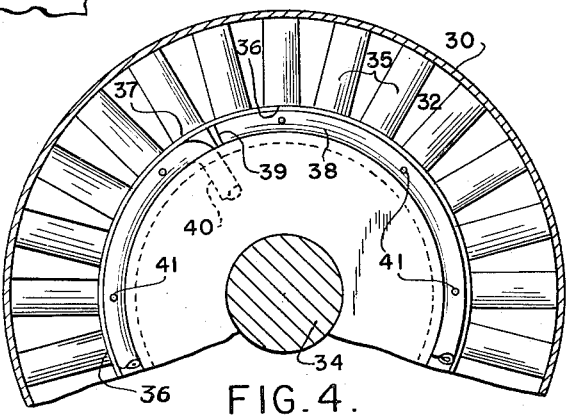
FIG. 5.
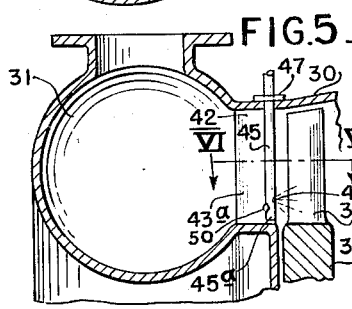
FIG. 6.
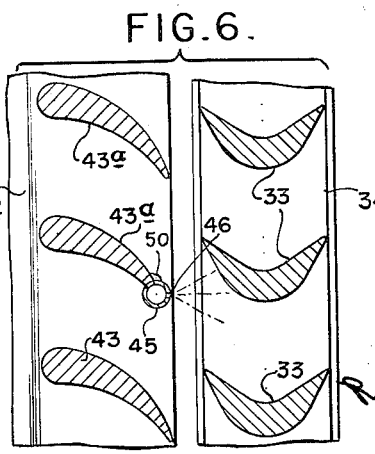
INVENTOR
EDWARD BURKE
GEORGE A. KEMENY
BY
Ralph T. French
ATTORNEY 2,857,133
Patented Oct. 21, 1958

2,857,133
TURBINE APPARATUS

Edward Burke and George A. Kemeny, Pittsburgh, Pa., assignors to Westinghouse Electric Corporation, East Pittsburgh, Pa., a corporation of Pennsylvania Application May 13, 1953, Serial No. 354,697

2 Claims. (Cl. 253—39.15)

This invention relates to turbines, and more particularly to means for spraying liquid into a turbine.

It is an object of this invention to provide improved means for introducing or spraying a fluid coolant from a stationary source or sources into a turbine.

Another object of the invention is the provision of improved liquid spray introduction means adapted to be used in a gas turbine power plant.

A further object is to provide improved spray means adapted to introduce cooling liquid, such as water, into the rotary blading of a gas turbine from a stationary point or a multiplicity of stationary points.

These and other objects are effected by our invention as will be apparent from the folowing description taken in connection with the accompanying drawings, forming a part of this application, in which:

Fig. 1 is a fragmentary sectional view of a portion of a gas turbine power plant having cooling spray means embodying one form of the invention;

Fig. 2 is an enlarged detail sectional view along the line II—II of Fig. 1;

Fig. 3 is a fragmentary sectional view of a portion of another gas turbine having spray introducing means constructed according to a different form of the invention;

Fig. 4 is a fragmentary sectional view along the line IV—IV of Fig. 3, somewhat reduced in detail;

Fig. 5 is a fragmentary sectional view of a gas turbine showing still another form of the invention; and Fig. 6 is an enlarged sectional view along the line VI—VI of Fig. 5.

Referring to Figs. 1 and 2, the portion of the typical gas turbine engine illustrated includes the upper sections of a cylindrical outer casing structure 10 and a coaxial inner tubular core section 11, which together form an annular gas passage 12 adapted to be supplied with hot motive gases from a combustion apparatus 13. A turbine rotor 14, carrying a plurality of radially disposed blades 15, is suitably journaled in the casing structure on bearings (not shown). Interposed in the gas passage 12 between the combustion apparatus 13 and rotary blades 15 is a nozzle diaphragm assembly 19, which comprises a plurality of air-foil guide vanes 20 and 20a radially extending between an inner shroud ring 21 carried by the core section 11, and an outer shroud ring 22 mounted in the outer casing structure 10. In operation, motive gas is directed between the vanes 20 for expansion between the rotating turbine blades 15.

According to the invention, a number of the guide vanes constitute liquid spray vanes 20a which are spaced at equidistant points among the plurality of stationary vanes of the diaphragm assembly 19, for introducing cooling liquid, such as water, into the stream of motive gases flowing through the passage 12. Each of the spray vanes 20a has formed therein a longitudinally extending passage 25, the outer end of which communicates with a duct 26 leading from a suitable liquid supply source (not shown). A plurality of laterally extending discharge openings 27 are formed in the downstream side of the spray vanes for receiving nozzles 28, which are adapted to effect discharge of liquid in the form of a spray or jet. Impingement of this spray on the turbine blading is effective to cool the latter.

In Figs. 3 and 4, a casing structure 30 is provided, forming an annular motive gas chamber 31 opening into an annular nozzle passage provided with a nozzle diaphragm structure 32 for directing gas into the blading 33 of a turbine rotor 34. The nozzle diaphragm structure 32 comprises a plurality of radially arranged airfoil vanes 35, each having a notch 36 formed in the trailing edge portion thereof. Mounted in the notches 36 in an annular radiation shield 37 which is open on the downstream side for receiving an apertured manifold comprising a substantially circular tube 38 having a closed end 39 disposed adjacent an inwardly bent end 40, which communicates with a suitable source of cooling liquid (not shown). A plurality of nozzle openings 41 are spaced along the downstream side of the tube 38, for spraying liquid into the gas stream entering the blading 33 of the turbine.

Referring to the form of the invention illustrated in Figs. 5 and 6 of the drawing, the casing 30 has mounted in the nozzle passage thereof an annular diaphragm structure 42, comprising radially disposed airfoil vanes 43 and 43a. The vanes 43a are equally spaced between groups of the more numerous vanes 43, and are similar thereto in conformation except for the provision on their trailing edges of spray tubes 45. Each spray tube extends parallel to the associated vane 43a and has a closed inner end 45a which is welded at 50 to the adjacent edge of the vane. A nozzle opening 46 is formed in the downstream side of each tube near the closed end. The opposite end of each spray tube extends through suitable apertures in the casing structure 30 and in an apertured slider member 47 that is secured to the outer casing surface. A sliding fit is provided between each spray tube 45 and the associated slider member 47, for minimizing leakage of motive fluid while permitting the tube to expand relative to the vane element. The outer ends of the spray tubes may be connected to the usual cooling liquid source (not shown).

It will thus be seen that with a turbine equipped with nozzle diaphragm structure and improved spray introduction means constructed and arranged in accordance with the invention, the turbine blading may effectively be cooled and the mass of motivating gases augmented by addition thereto of water or other fluid coolant spray, which may be directed toward the rotary turbine blading from selected points in the stationary vane assembly.

While the invention has been shown in several forms, it will be obvious to those skilled in the art that it is not so limited, but is susceptible of various other changes and modifications without departing from the spirit thereof.

What is claimed is:

1. In a gas turbine, casing structure forming an annular passageway, a plurality of radially disposed stationary nozzle vanes circumferentially spaced in said annular passageway, each of said vanes comprising an airfoil body with leading and trailing edges, the trailing edges of said vanes having notches formed therein adjacent the radially inner ends of the vanes, a substantially annular, apertured fluid manifold mounted in said notches and having an open end, and fluid supply conduit means connected to the open end of said manifold.

2. In a gas turbine, casing structure forming an annular passageway, a plurality of radially disposed stationary nozzle vanes circumferentially spaced in said annular passageway, each of said vanes comprising an airfoil body with leading and trailing edges, the trailing edges of said vanes having notches formed therein adjacent the radially inner ends of the vanes, a substantially annular, apertured fluid manifold mounted in said notches and having an open end, fluid supply conduit means connected to the open end of said manifold, and an annular radiation shield receiving said manifold.

References Cited in the file of this patent

UNITED STATES PATENTS

| | | |
|---|---|---|
| 2,457,833 | Redding | Jan. 4, 1949 |
| 2,549,819 | Kane | Apr. 24, 1951 |
| 2,585,871 | Stalker | Feb. 12, 1952 |
| 2,625,793 | Mierley | Jan. 20, 1953 |
| 2,647,368 | Triebbnigg | Aug. 4, 1953 |
| 2,653,446 | Price | Sept. 29, 1953 |
| 2,675,672 | Schorner | Apr. 20, 1954 |

FOREIGN PATENTS

| | | |
|---|---|---|
| 531,445 | Great Britain | Jan. 3, 1941 |
| 615,689 | Great Britain | Jan. 10, 1949 |
| 671,228 | Great Britain | Apr. 30, 1952 |

UNITED STATES PATENT OFFICE
CERTIFICATE OF CORRECTION

Patent No. 2,857,133                                                      October 21, 1958

Edward Burke et al.

It is hereby certified that error appears in the printed specification of the above numbered patent requiring correction and that the said Letters Patent should read as corrected below.

Column 1, line 28, for "folowing" read — following —; column 2, line 13, for "notches 36 in" read — notches 36 is —.

Signed and sealed this 30th day of June 1959.

(SEAL)
Attest:

KARL H. AXLINE
Attesting Officer

ROBERT C. WATSON
Commissioner of Patents